No. 752,887. PATENTED FEB. 23, 1904.
T. S. CRAPP & R. C. FINCH.
BRICK MACHINE.
APPLICATION FILED JUNE 16, 1903.
NO MODEL. 6 SHEETS—SHEET 1.
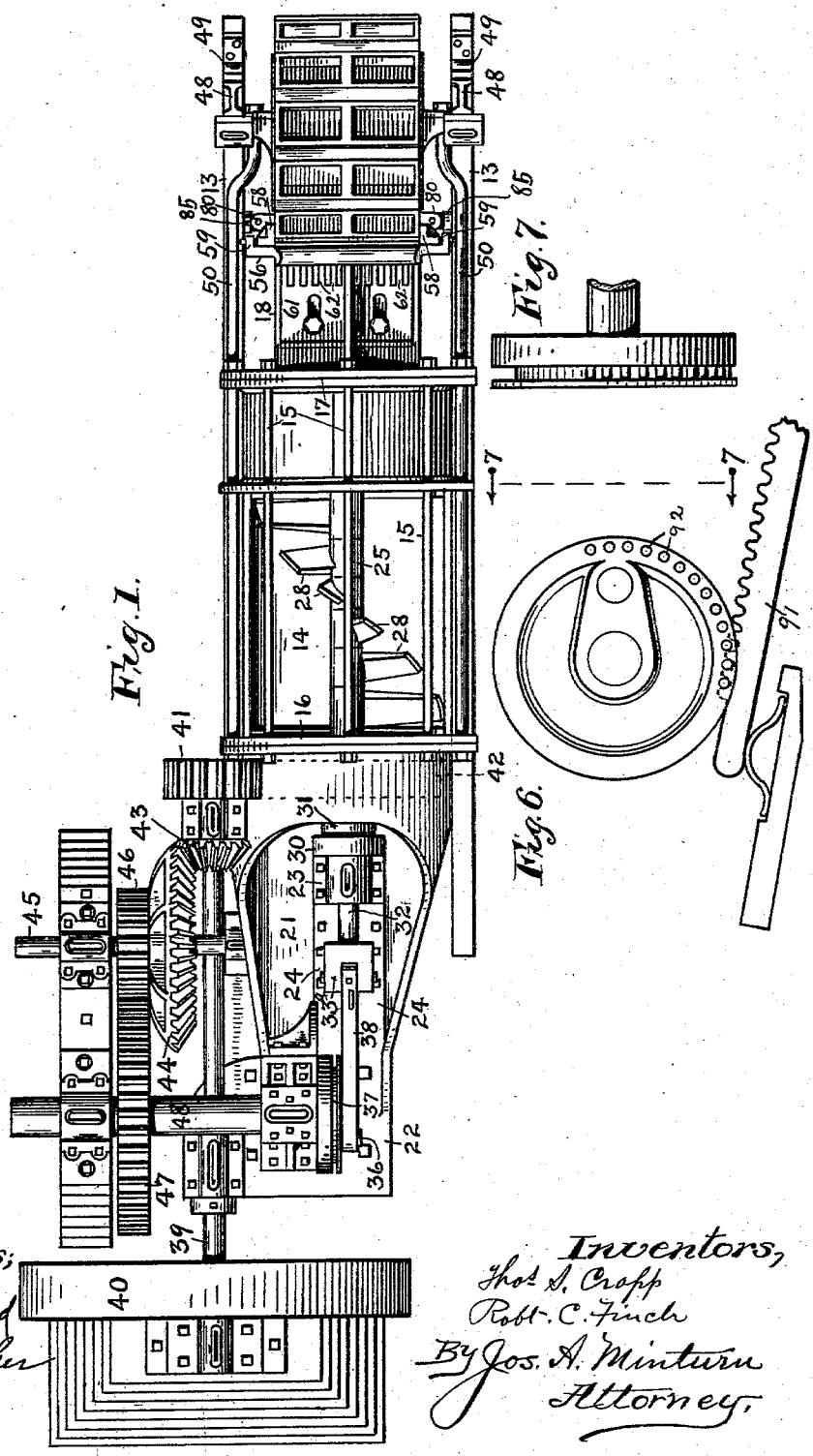

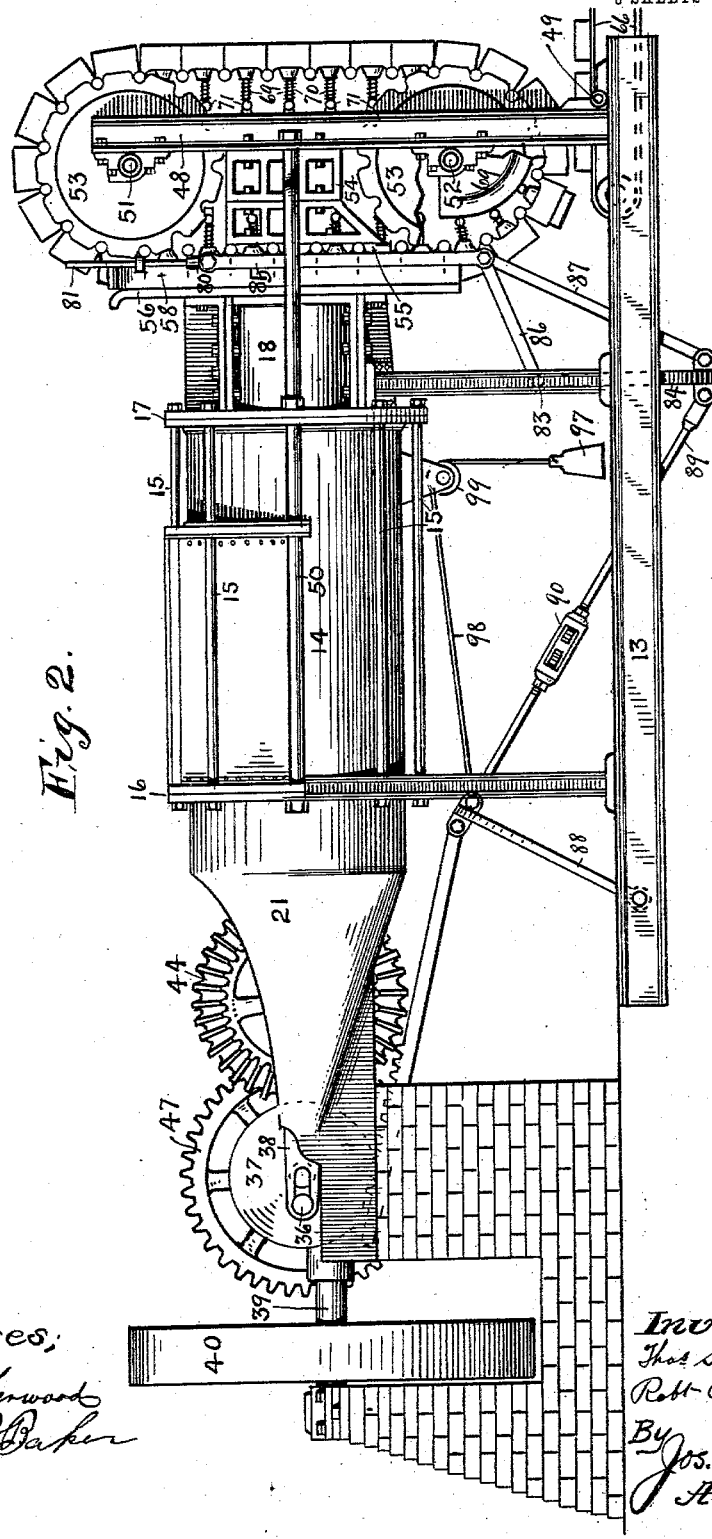

No. 752,887. PATENTED FEB. 23, 1904.
T. S. CRAPP & R. C. FINCH.
BRICK MACHINE.
APPLICATION FILED JUNE 16, 1903.
NO MODEL. 6 SHEETS—SHEET 3.
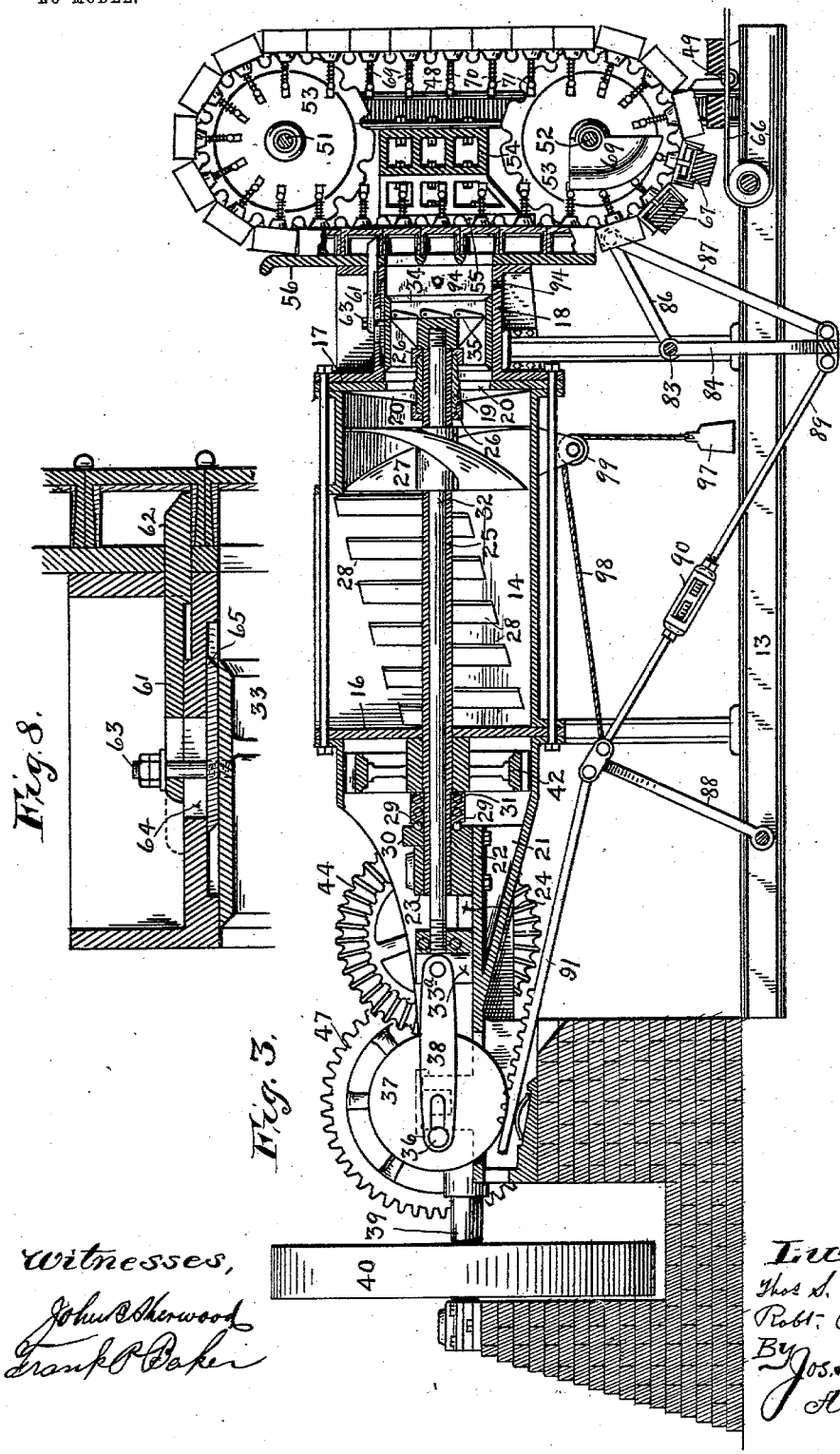
Witnesses,
John B. Sherwood
Frank P. Baker
Inventors,
Thos. S. Crapp,
Robt. C. Finch
By Jos. A. Minturn
Attorney.

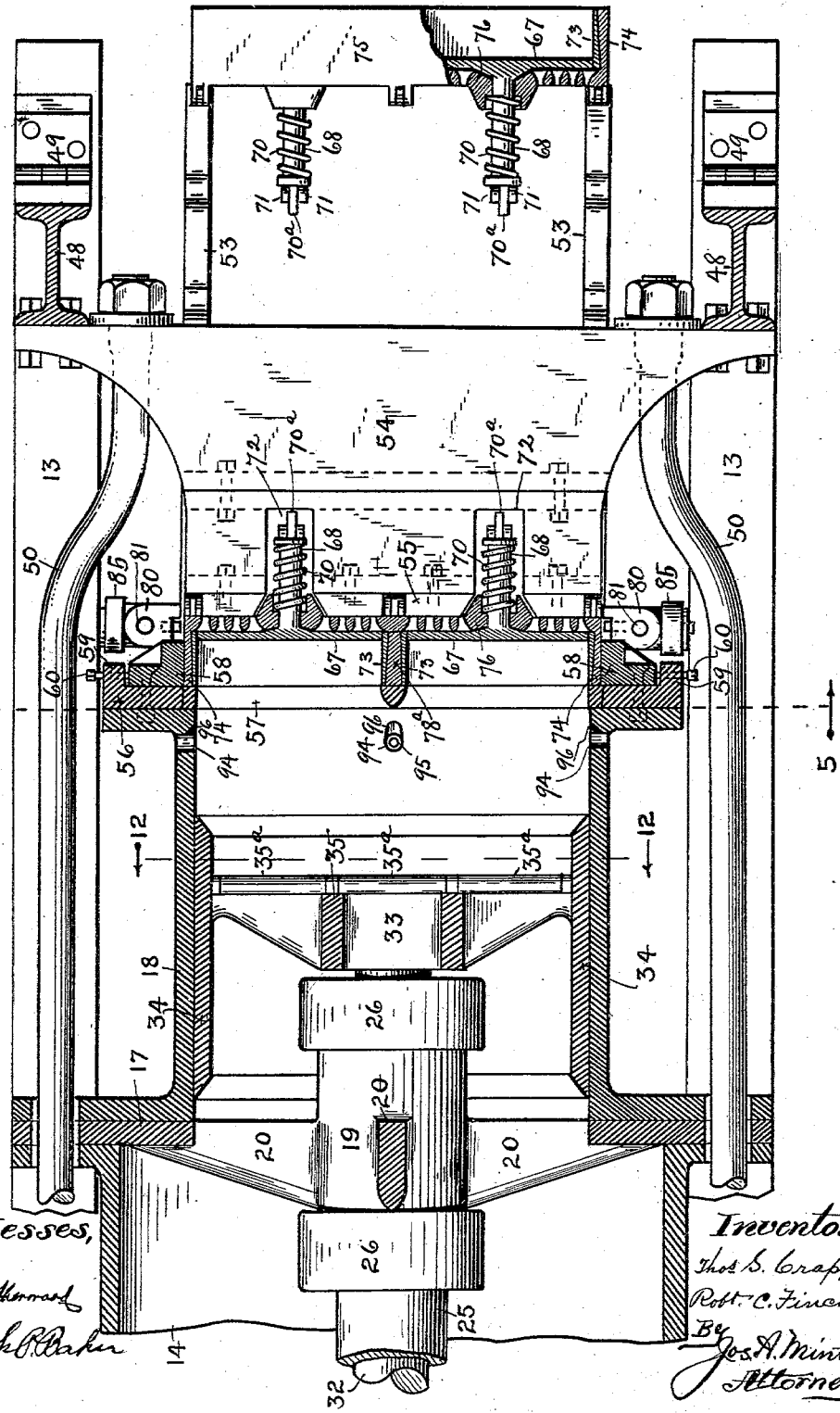

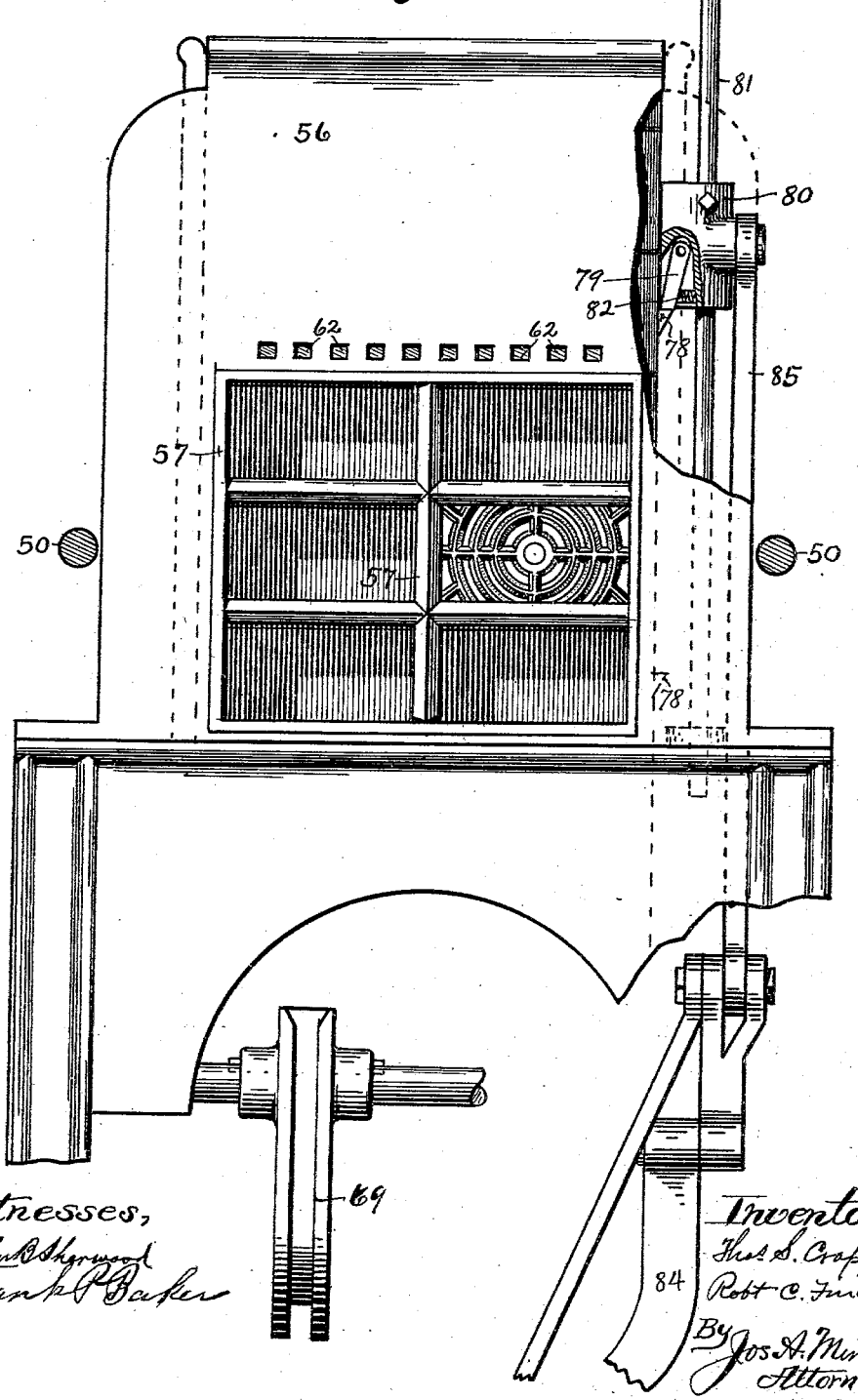

No. 752,887. PATENTED FEB. 23, 1904.
T. S. CRAPP & R. C. FINCH.
BRICK MACHINE.
APPLICATION FILED JUNE 16, 1903.
NO MODEL. 6 SHEETS—SHEET 6.
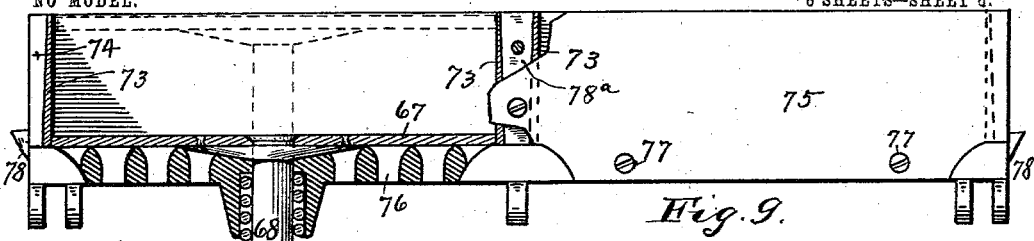
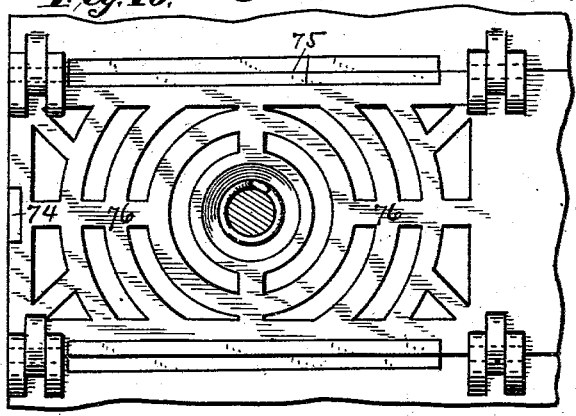
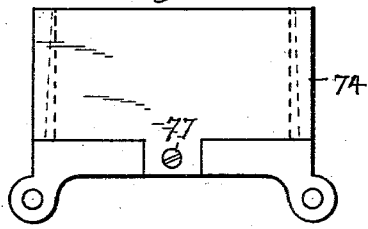
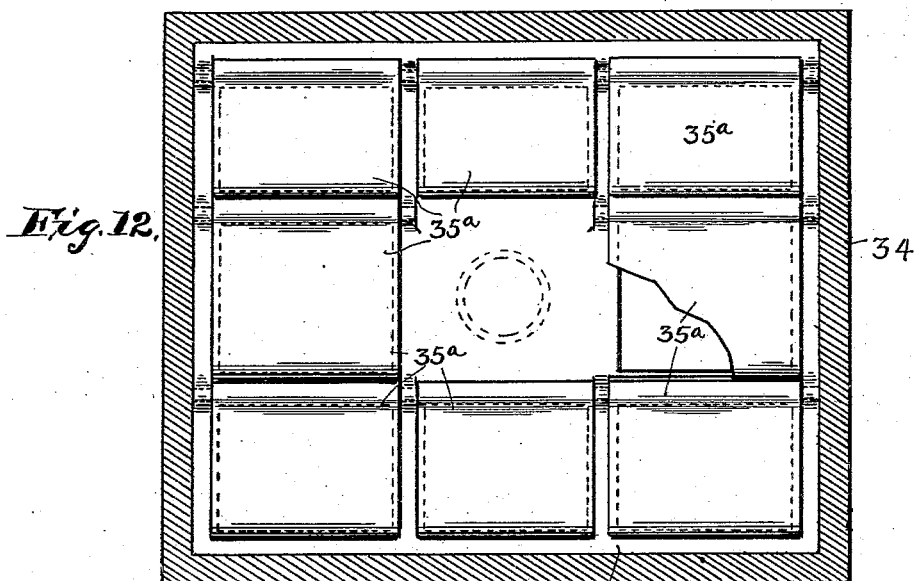
Witnesses.
John R. Kenwood
Frank P. Baker
Inventors,
Thos. S. Crapp.
Robert C. Finch.
By Jos. A. Minturn
Attorney.

No. 752,887. Patented February 23, 1904.

UNITED STATES PATENT OFFICE.

THOMAS S. CRAPP AND ROBERT C. FINCH, OF INDIANAPOLIS, INDIANA, ASSIGNORS TO FRANK GLESSNER, OF SHELBYVILLE, INDIANA.

BRICK-MACHINE.

SPECIFICATION forming part of Letters Patent No. 752,887, dated February 23, 1904.

Application filed June 16, 1903. Serial No. 161,664. (No model.)

*To all whom it may concern:*

Be it known that we, THOMAS S. CRAPP and ROBERT C. FINCH, citizens of the United States, residing at Indianapolis, in the county of Marion and State of Indiana, have invented certain new and useful Improvements in Brick-Machines, of which the following is a specification.

This invention relates to improvements in machines for molding brick under pressure; and the object is to combine with a pug-mill and press mechanism that will automatically mold and discharge the brick from the molds upon a conveyer without injury to the brick.

The object also is to provide a simple, compact, and durable machine that will produce pressed brick in a rapid manner with a small expenditure of power and labor and to compress the clay into the molds under any desired pressure within the limits of the machine.

The object also is to work stiffer clay than has heretofore been done in this class of machines.

The objects of the invention are accomplished by the mechanism illustrated in the accompanying drawings, in which—

Figure 1 is a plan view of the complete invention; Fig. 2, a side elevation of same, showing the lower mold-carrying wheel broken away in part to show the mold-discharging mechanism; Fig. 3, a longitudinal vertical section of the machine, as shown in Figs. 1 and 2; Fig. 4, a detail in horizontal section of the press-box and molds on a plane coincident with the top of the platen of the brick-press, the view being on a larger scale than the preceding figures; Fig. 5, a detail in vertical section of the upper and middle portion of the machine on the line 5 5 of Fig. 4. This Fig. 5 shows some of the parts broken away to illustrate other parts at the rear. Fig. 6 is a detail in side elevation, and Fig. 7 a face or edge view, of the toothed crank-wheel mounted on the main shaft of the machine. Fig. 8 is a vertical section of the mechanism for resisting the upward movement of the molds under pressure and is a detail, on a larger scale, of the mechanism shown on a smaller scale in Fig. 3. Fig. 9 is a side elevation and partial section of a pair of molds. Fig. 10 is a detail in under side view of the bottom of a mold. Fig. 11 is an end view of a mold; and Fig. 12 is a cross-section on the line 12 12 of Fig. 4, showing the piston-head and its valves.

Like characters of reference indicate like parts throughout the several views of the drawings.

13 represents I-beams, which support the body of the machine.

14 is the pug-mill body, which may be of any usual or suitable construction, here shown as a suitable shell which is held between end heads 16 and 17 by means of the outside longitudinal rods 15. Adjacent to the end 17 of the pug-mill is a press-box 18, which communicates interiorly with the interior of the said mill. At the center of the opening between the pug-mill and press-box is the journal-box 19, which is supported by suitable radial webs 20. Projecting longitudinally and outwardly from the opposite end of the mill—that is, from head 16—is the shell or girder-frame 21, having the horizontal bed-plate 22, which has the pillow-block 23 and the guide-bars 24, the latter forming a slideway. Extending longitudinally and centrally of the pug-mill is the hollow shaft 25, which is supported by the journal-box 19 and the pillow-block 23. The ends of the box 19 are capped by caps 26 and suitably packed to prevent the access of clay between the bearings. Mounted on the hollow shaft 25, adjacent to the press-box, is the spiral conveyer 27, which force-feeds the clay from the mill into the said press-box, and mounted on said shaft within the pug-mill proper are the blades 28 of any well-known or suitable construction and for the usual purposes of mixing and preparing the clay.

As most of the strain on shaft 25 will be an end thrust toward or against the pillow-block 23 the friction will be relieved as much as possible by the introduction of ball-bearings 29 (see Fig. 3) between the pillow-block or the extension 30 therefrom and a collar 31, secured in a fixed manner upon the shaft adjacent to said extension. Suitable ball-races are formed in the contiguous faces of parts 30 and 31.

Passing through the hollow shaft 25 is a piston-rod 32. This rod 32 is screwed or otherwise secured to the block 33ª, which block has a sliding reciprocatory movement on the bed-plate 22, controlled by the guides 24. The other end of the rod 32 terminates within the press-box 18, and to it is fastened the piston 33. This piston comprises an outer wall or shell 34, having inwardly-beveled edges, so as to present the minimum obstruction when the piston is forced through the clay, and it has the transverse wall or diaphragm 35, Figs. 3, 4, and 12, which diaphragm has a plurality of openings for the clay to pass through when the clay is moving outwardly by the action of the spiral conveyer 27, but the return of which clay when the piston is moved forward in imparting the pressure is prevented by the hinged closures or valves 35ª.

The reciprocation of the piston-rod and of the piston through said rod is accomplished by connecting the block 33ª with the wrist-pin 36 on the crank-wheel 37 by means of the pitman 38. The pitman is longitudinally slotted to receive the wrist-pin 36 in order to give an intermittent movement to the piston. The intermissions are for the purpose of allowing filled molds to be replaced with empty ones before each period of pressure at every revolution of the crank-wheel.

Power to drive the mechanism above described is applied in the following manner: The power-shaft 39, mounted in a suitable manner longitudinally of the machine has the belt-pulley 40, to which power from any suitable motor is applied in the usual way. This shaft has the spur-gear pinion 41, which meshes with the wheel 42, mounted on the hollow shaft 25, and through this means the shaft 25 and all of its attached mechanism are driven. Also mounted on shaft 39 is the bevel-pinion 43, the teeth of which engage those of the bevel-wheel 44, mounted on the transverse shaft 45. On shaft 45 is the spur gear-wheel 46, the teeth of which mesh with those of wheel 47, mounted on the same shaft 48, which carries the crank-wheel 37.

The construction of the molds in which the brick are pressed, the manner and means for presenting them opposite the mouth of the press-box to be filled, and for discharging the pressed product therefrom will now be described.

48 represents a pair of vertical standards, preferably I-beams, which are secured by means of the hinges 49 to the tops of the girders 13, so as to permit the standards and all of the mechanism carried by them to be swung or folded down away from the end of the machine. This is convenient for the purposes of repairs, for cleaning, and for the making of adjustments. The firm vertical position to resist the pressure of the press is insured by the side rods 50 50, which connect the standards 48 with the heads of the pug-mill, thereby securely tying the standards to the body of the machine.

Mounted one above the other in suitable boxes attached to the standards are the parallel and horizontal shafts 51 and 52, and loosely mounted on each of these shafts (which shafts are fixed or stationary—that is, non-revoluble) are the mold-wheels 53 53 53 53, a pair on each shaft, and passing around these two pairs of wheels are a plurality of molds, each having closed ends, sides, and bottom, but open on their outer or top faces. These molds are preferably in rigidly-connected transverse pairs, and the several pairs are hinged together so as to form a continuous or endless chain extending around the upper and lower mold-wheels.

Bolted to the standards 48, opposite the mouth of the press-box, is the platen 54, having a face-plate or sole 55, made removable, so as to be easily renewable as it receives the direct wear from contact with the molds. For the same reason it will be made out of a harder metal than the inner portions of the platen. For convenience of manufacture the body of the platen will be in two transverse vertically-divided sections. Between the molds and the adjacent end of the press-box is a face-plate 56 to hold the molds back into position against the sole of the platen. It extends below the press-box a suitable distance to confine the molds and their contents until the place for discharge is reached. The face-plate is cut away opposite the press-box to receive the die-plate 57, having perforations (see Fig. 5) corresponding in area, position, and shape with the series of molds that are to be filled with clay at each operation of the press. The cross-bars of this frame will have knife-edges toward the press-box to more readily divide the clay and direct it to the molds.

To prevent the spreading laterally of the molds under the great pressure to which they are subjected in pressing the clay therein, the vertical guides and retainers 58 are employed, one on each side of the machine. These are bolted to the face-plate 56, the latter have the flanges 59, as shown in Fig. 4, through which the set-screws 60 are screwed into contact with the said retainers 58, whereby the latter are adjusted to the molds, as may be required.

As the set of molds last filled are immediately below the new set to be filled and are wedged in tight between the platen and the face-plate, they provide a sufficient resistance from below to prevent the spreading of the molds under pressure in that direction; but so far as described no provision has been made to keep the molds from spreading in a vertical direction. This is provided for in the machine, however, by the horizontal plate 61, which is seated on top of the press-box and has fingers 62, which extend through suitable perforations through the face-plate into the empty molds next above the ones that are to be filled and by contact with the lower side of said molds form a stop to prevent the upward movement of the molds below. The plate is connected by bolts 63 with the piston in the press-box below. The top of the press-box has the longitudinal slots 64 (see Fig. 8) for the necessary play of the bolt, and as the required movement of the fingers is less than the whole movement of the piston the perforations of the plate 61 to receive the bolts are provided to take up the excess movement. A constant closure of the slots 64 is insured by the auxiliary inside sliding plates 65.

Below the lower set of mold-wheels is the carrier-apron 66, upon which the pressed clay is deposited as the molds make the under turn in their circuit. The apron conveys the green bricks away from the machine. The automatic discharge of the molded clay from the molds is accomplished as follows: The molds are each provided with a false movable bottom 67, Figs. 4 and 9, which movable bottoms are each attached to a stem 68, that projects through the fixed bottom of the mold to a suitable distance, so as to contact with the fixed discharging-cams 69. The cams are shaped so as to gradually force the stems into the molds as the latter travel downwardly, and by so doing the bottoms which they control are moved toward the mouth of their respective molds, thereby forcing the molded bricks out upon the apron. A spring 70, coiled around each stem, operates to return the movable bottom to its inner normal position.

The cams 69 will have longitudinally-grooved peripheries, into which the reduced ends 70$^a$ of the stems take in passing, and to reduce the friction the stems on each side of the reduced portions will have the friction-rollers 71. As shown at 72 in Fig. 4, the platen and its sole will be provided with vertical grooves to allow the unrestricted travel of the stems as the molds pass said platen.

The fixed bottom of the molds will preferably be perforated to form the gridiron pattern shown in order to allow of the free escape of clay, sand, and all foreign material that perchance might work back between the fixed and movable bottoms. The remaining metal will be tapered to knife-edges against the false bottom to afford minimum bearings for obstructions. As bricks must be of a uniform merchantable size, it is important to be able to replace any wear that occurs in the molds resulting from the severe and continuous use to which they are subjected. To this end removable linings 73, of non-corrosive material, to more easily discharge the brick are provided for the sides and ends of the molds, which will be retained in position by being wedge shape in cross-section, the thick edges being placed inwardly. To enable the tapered linings to be assembled in the molds, the ends 74 and sides 75 will be separate pieces from the bottom 76 and will be secured thereto by screws 77, as shown in Figs. 9 and 11. The partition 78$^a$, separating the molds of a pair mounted on the same base, is a removable one, which is retained by screws passing through the sides 75 into it.

The proper movement of the molds into position to be filled and thence to discharge the product is accomplished as follows: Certain of the molds—say every third or fourth one, as the circumstances may require—are provided with lugs 78, which project out into the paths of vertically-reciprocating dogs 79, (see Fig. 5,) carried by heads 80, which work on vertical guide-rods 81. Each dog is pivoted at its upper end, and its lower end is pressed out by a spring 82 to engage the lugs on the downward movement of said dogs. Pivoted at 83 to the legs of the press is the downwardly-cranked yoke 84, and pivotally secured to the heads 80 are the link-bars 85, the lower ends of which are connected with the yoke 84 by the bars 86 and 87, which are braced, as shown, to form trussed frames, which have a bell-crank action on the link-bars 85 around the pivots 83. Pivotally secured to the girders 13 is the yoke 88, which is connected by rod 89 with the bottom or middle of yoke 84. The rod has the turnbuckle 90 to permit adjustment in the length of the rod to present the vertically-reciprocating dogs 79 properly to engage the lugs of the molds. Pivotally secured to the yoke 88 on the opposite side from the attachment of rod 89 is the rack-bar 91, having teeth on its upper edge to engage corresponding teeth in peripheral groove of crank-wheel 37. The said teeth 92 extend approximately one-quarter of the way around the periphery of the crank-wheel, the remainder of the periphery being blank, so as to give the rack-bar movement in direction to lower the molds and then release it so as to allow the mold-lowering mechanism to be returned to position for next downward movement of the molds by the action of weight 97, which is connected by cable 98 with the top of yoke 88. The cable passes over the pulley 99. The action will be understood from the drawings.

Should there be an amount of clay in front of the piston in excess of what can be pressed into the molds, there would be danger of bursting the sides of the press-box. To obviate this danger, the relief-openings 94 are formed through the press-box walls, as shown in Fig. 4, and these openings may be partially regulated in size by bushings 95, having different sizes of openings. The perforations will preferably be inside of the full limit of the piston-stroke, so that the piston will cover it by degrees as it moves toward the end of its stroke, thereby gradually decreasing the outlet, and leading into the perforations from points beyond the limits of the piston-stroke may be grooves 96, which will always afford some escape for the clay until they have been passed by the piston. It is the adjustment of the length and depth of these grooves that will give any required pressure on the clay in the mold up to and within the capacity of the machine to resist, as during the time of three-quarter inches of travel of the piston the crank-pin passes through an arc two and five-eighths inches in length, and if the groove be closed, or nearly so, the pressure becomes well-nigh irresistible.

The object sought to be attained is the use of the stiffest possible clay under a positive pressure, thus reducing the time in which brick may be stacked from the machine to the kiln, thereby increasing the capacity of a given plant and reducing the cost of handling and caring for the output between the machine and burning, which is a large cost item where ordinary wet clay is used in a machine that does not give a positive pressure in the molds.

Having thus fully described the invention, what is claimed as new, and desired to be secured by Letters Patent, is—

1. In a machine for pressing brick, a press-box a pug-mill discharging therein, molds moving in a transverse vertical plane across the discharge end of said press-box, a hollow revoluble shaft, a piston-rod passing through the hollow shaft, means for intermittently reciprocating the piston-rod and a plunger mounted in said press-box on said piston-rod.

2. In a brick-press, a pug-mill, a hollow shaft rotating therein, clay treating and conveying mechanism on said shaft, a press-box into which the pug-mill discharges, a piston in said press-box, a piston-rod passing through the hollow shaft and connected with said piston, means for reciprocating the piston-rod, and molds moving intermittently in a right plane across the discharge-opening from said press-box.

3. In a brick-press, a press-box, and a piston reciprocating therein to force the clay out of the press-box, said piston having one or more transverse openings for the forward passage of the clay and closures hinged to the piston so as to close the openings and prevent back movement of the clay.

4. A press-box for brick-machines having auxiliary relief-openings in its sides to be partially or wholly closed by the piston and radial grooves leading thereto.

5. A press-box for brick-machines having auxiliary relief-openings and bushings in said openings to regulate the size of the discharge.

6. In a brick-press, a pug-mill, a hollow shaft rotating therein, clay treating and conveying mechanism on said shaft, a pillow-block supporting that end of the shaft away from which the clay is conveyed, a collar extension from said shaft between the pug-mill and the pillow-block adjacent to the latter, and ball-bearings between the collar and said block.

7. In a brick-press, a pug-mill, a hollow shaft rotating therein, clay treating and conveying mechanism on said shaft, a press-box into which the pug-mill discharges, a piston in said press-box, a piston-rod passing through the hollow shaft and connected with said piston, a sliding head to which the other end of the piston-rod is fastened, a revoluble crank-wheel having a wrist-pin, and a pitman connecting the sliding head with the wrist-pin, said pitman having a longitudinal slot to receive the wrist-pin to give an intermittent movement to the piston-rod.

8. In a machine for pressing brick, a press-box, a piston located therein, a sliding head, a piston-rod connecting the piston with the sliding head, a crank-wheel having a wrist-pin, a pitman connecting the sliding head and wrist-pin said pitman having a longitudinal slot to receive the wrist-pin and give an intermittent movement to the piston, and molds moving intermittently across the discharge-opening of said press-box.

9. In a machine for pressing brick, a press-box having a discharge-opening, means for forcing clay through the press-box under pressure, molds hinged together in an endless chain, mold-wheels above and below the press-box around which the chain of molds is passed, said molds passing the discharge-opening from the press-box with the mold-openings toward the press-box, a platen back of the molds to sustain them under pressure, a false bottom for the molds, means for dumping the contents of the molds as they make the turn around the bottom wheels by an outward movement of the false bottom and springs to return said bottoms to their inner normal positions.

10. In a brick-machine, a press-box, means for forcing clay through it under pressure, molds hinged together in an endless chain, passing the discharge-opening from the press-box, wheels above and below the press-box around which the chain of molds passes, a platen opposite the end of the press-box, behind the molds to resist the pressure, and means for discharging the product of the molds as the latter make their turn around the lower wheels, said means comprising false movable bottoms to the molds, stems secured to said false bottoms and extending through and beyond the fixed bottom of the molds, cams in the paths of said stems to move the stems longitudinally so as to move the false bottoms toward the mouths of the molds and force out the product and springs to return the bottoms to normal position.

11. In a brick-machine, a press-box from which clay issues under pressure, mold-wheels above and below the press-box, molds hinged together in an endless chain, passing around the mold-wheels, a platen back of the molds opposite the press-box, a face-plate between the path of the molds and the end of the press-box having openings for the passage of the clay and guides and retainers at the outer ends of the molds.

12. In a brick-machine, a press-box, molds hinged together in an endless chain which passes the discharge from said press-box, a platen behind the molds opposite the end of the press-box and a removable sole-plate between the molds and the platen.

13. In a brick-machine, a press-box from which clay issues under pressure, molds hinged together in an endless chain passing the outlet from said press-box, and holders which enter the first unfilled mold above those in process of filling, during the period of pressure, to keep the molds from spreading in an upward direction.

14. In a brick-press, a press-box having a reciprocating piston, molds in an endless chain passing the discharge-opening from said press-box, a plate on top of the press-box, having fingers, said plate having a longitudinal reciprocating adjustment whereby said fingers are introduced during the period of pressure, into the first upper empty mold to engage the side of the mold and prevent spreading of the molds below in that direction, said press-box being slotted under the finger-plate and a bolt passing through the slotted press-box and connecting the finger-plate with the piston.

15. In a brick-machine, a press-box from which clay issues under pressure, molds hinged together in an endless chain which pass the press-box outlet to be filled, said molds having lugs at their outer ends, a head, a dog pressed by a spring into the path of the lugs, and means for reciprocating the head in the direction of the travel of the molds.

16. The combinination with a brick-machine, of vertical standards, mold-wheels supported above and below the clay-discharge of the machine by said standards, molds hinged together in an endless chain, passing around the upper and lower mold-wheels, said molds having movable false bottoms, stems secured to said bottoms and extending inwardly from the molds, springs around the stems to hold the false bottoms in normal position against the fixed bottom of the mold, and a fixed or stationary cam at the bottom turn of the molds against which the stems contact so as to be moved longitudinally and discharge the contents of the molds and a carrier-apron to receive the discharge and remove it.

In witness whereof we have hereunto set our hands and seals, at Indianapolis, Indiana, this 9th day of June, A. D. 1903.

THOMAS S. CRAPP. [L. S.]
ROBERT C. FINCH. [L. S.]

Witnesses:
J. A. MINTURN,
S. MAHLON UNGER.